United States Patent [19]
Mitsumatsu et al.
[11] Patent Number: 4,571,660
[45] Date of Patent: Feb. 18, 1986

[54] LIGHTNING ARRESTER INSULATOR

[75] Inventors: Yoshio Mitsumatsu, Aichi; Akio Kamio, Okazaki; Shoji Seike, Nagoya; Masayuki Nozaki, Aichi, all of Japan

[73] Assignee: Mitsubishi Denki Kabushiki Kaisha & NGK Insulators Chubu Electric Co., Inc., Japan

[21] Appl. No.: 528,032

[22] Filed: Aug. 31, 1983

[30] Foreign Application Priority Data

Sep. 14, 1982 [JP] Japan ............................ 57-160555

[51] Int. Cl.[4] ............................................ H02H 9/04

[52] U.S. Cl. .................................. 361/127; 361/126

[58] Field of Search ...................... 361/127, 128, 126; 174/179

[56] References Cited

U.S. PATENT DOCUMENTS 3,549,791 12/1970 Yonkers ............................ 174/179

4,315,699 2/1982 Lusk .................................. 174/179

*Primary Examiner*—Harry E. Moose, Jr.
*Attorney, Agent, or Firm*—Parkhurst & Oliff

[57] ABSTRACT

A lightning arrester insulator in which a voltage non-linear resistor having a major constituent of zinc oxide is integrally fixed in a longitudinal bore in the insulator with a layer of an inorganic adhesive agent which is interposed between an outer surface of the resistor and an inner wall surface of the insulator defining the longitudinal bore. A contact angle of the adhesive agent layer defined by each end face thereof and an associated end part of the inner wall surface is held within a range of 10 to 60 degrees. To establish the contact angle, at least one of the end face of the adhesive agent layer and the associated end part of the inner wall surface of the insulator is inclined with respect to the longitudinal centerline of the longitudinal bore. Each end surface of the voltage non-linear resistor is spaced from the corresponding end of the adhesive agent layer axially inwardly along the longitudinal centerline of the longitudinal bore.

13 Claims, 3 Drawing Figures

LIGHTNING ARRESTER INSULATOR

BACKGROUND OF THE INVENTION

This invention relates to a lightning arrester insulator in which a voltage non-linear resistor having a major constituent of zinc oxide (ZnO) is integrally fixed in the insulator with an inorganic adhesive agent.

There have been employed several kinds or types of lightning arresters in order to protect a power generating facility or plant, a substation and an insulator of the arrester itself against an excessive current or surge caused by a thunderbolt or lightning or for other reasons. A lightning arrester of the type disclosed in Japanese Patent Applications published under Laid-Open Nos. 124294/1979 and 32308/1980, wherein a voltage non-linear resistor having a major constituent of ZnO is integrally fixed in the insulator with an inorganic adhesive agent such as cement or glass, shows superior arresting characteristics, and has been in the limelight among other types of lightning arresters.

This known type of voltage non-linear resistor having a major constituent of ZnO has been improved in its resistance to deterioration by using a method wherein, as described in the above-identified prior publications, an intermediate layer of an inorganic adhesive agent such as cement or glass is interposed between the resistor and the inner surface of the insulator to reduce a surface area of the resistor contacting the surrounding air, in view of the fact that a resistance value of the resistor is gradually decreased under a reaction with a moisture, even when only a small amount is contained in the air and that a quantity of heat generated from the resistor is gradually increased, thereby producing a possibility of rupture of the insulator or other components of the insulator.

However, as described in the prior publications, the mere presence of such an intermediate adhesive layer, for example a glass layer between the insulator and the voltage non-linear resistor having ZnO as a major constituent, will not completely solve the prior problem; there are still the disadvantages that some cracks may be generated at interfaces between the adhesive layer and the insulator and/or the resistor of ZnO, with a result of possible destruction of the insulator leading to a serious accident. Such destruction, for example, may be due to a thermal stress which can be produced when the resistor of ZnO is rapidly cooled after its heat treatment during manufacture or by a rain or snow failing upon the insulator which has been heated by a charging of voltage or when the resistor is rapidly heated by lightning. Such thermal stress is caused by differences in physical properties such as the coefficient of thermal expansion, thermal conductivity and mechanical strength between the materials used.

SUMMARY OF THE INVENTION

It is accordingly an object of the present invention to provide a lightning arrester insulator which overcomes those disadvantages experienced in the prior art lightning arresters, and which is free from physical damage to the insulator even under a thermal stress caused at an elevated temperature of the resistor of ZnO, such thermal stress arising when the insulator is manufactured or when the insulator is struck by a thunderbolt.

According to the invention, there is provided a lightning arrester insulator in which a voltage non-linear resistor having a major constituent of ZnO is integrally fixed in a longitudinal bore of the insulator through a layer of an inorganic adhesive agent which is interposed between an outer surface of the resistor and an inner wall surface of the insulator defining the longitudinal bore. A contact angle $\theta$ of the inorganic adhesive agent layer defined by each end face thereof and an associated end part of the inner wall surface of the insulator is held within a range of 10° to 60°. Preferably, the voltage non-linear resistor is buried in the insulator, that is, each end surface of the resistor is spaced from the corresponding end of the adhesive agent layer axially inwardly along the longitudinal centerline of the longitudinal bore.

Thus, the present invention is based on the findings and results of several studies made to investigate why the lightning arrester insulator in which a voltage non-linear resistor having a major constituent of ZnO is damged by a thermal stress applied during manufacture or operation thereof, and to seek a structure which is suitable to protect the insulator against such thermal damage.

BRIEF DESCRIPTION OF THE DRAWINGS

The above and other objects, features and advantages of the present invention will become more apparent from reading the following description of the preferred embodiments taken in connection with the accompanying drawings, wherein.

DETAILED DESCRIPTION OF THE PREFERRED EMBODIMENTS

Figure 1:
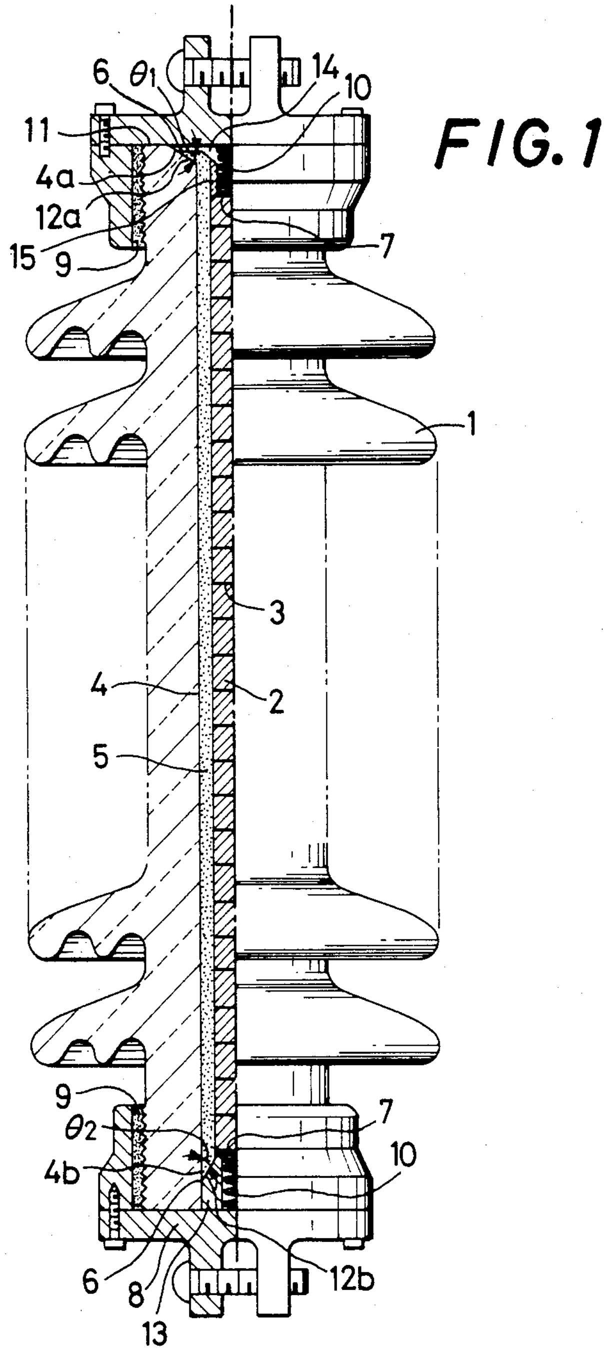
FIG. 1 is an illustrative schematic view, partly in cross section, of one preferred embodiment of a lightning arrester insulator of the present invention.

Referring now to FIG. 1, which discloses one preferred embodiment of the present invention, there will be described a more detailed construction of a lightning arrester insulator of the invention, wherein a plurality of voltage non-linear resistors 2, each having a major constituent of zinc oxide (ZnO) and containing small amounts of additives and impurities such as $Bi_2O_3$, $Sb_2O_3$, CaO and MgO and the like, are stacked or superposed one on another in a pile in a longitudinal bore formed in an insulator 1, made of porcelain or the like. An electrically conductive paste 3, such as silver or the like, is used to bond adjacent non-linear resistors 2 together. Then, a layer of an inorganic adhesive agent 5 (hereinafter referred to as "adhesive layer 5") made of a glass material having a melting point of 350° C. to 800° C., preferably 400° C. to 650° C., is formed between the stack of voltage non-linear resistors 2 and the inner wall surface 4 within the body of the insulator 1. Thus, an integrally fixed assembly of the insulator 1 and the voltage non-linear resistors 2 is formed.

Contact angles $\theta_1$ and $\theta_2$, at which both end faces of the inorganic adhesive layer 5 contact inner surfaces 4$a$ and 4$b$ of the insulator 1 at corresponding ends thereof, are selected to be within a range of 10° to 60° inclusive, preferably 15° to 40° inclusive. In other words, each end face 6 of the adhesive agent layer 5 cooperates with the associated end part 4*a*, 4*b* of the inner wall surface 4 of the insulator 1 to define the contact angle θ.

Further, the lightning arrester insulator according to the present invention is constructed such that the resistors 2 are buried in the insulator. More specifically stated, each end surface 7 of the stack of voltage non-linear resistors 2 is spaced axially inwardly of the insulator 1 from the corresponding end face or tip 6 of the adhesive layer 5 contacting the inner wall surface 4*a*, 4*b* at the respective end part of the insulator 1, preferably by more than 10 mm, along the longitudinal centerline of the longitudinal bore. Metal fittings 8, as in the form of a metal flange or cap, are fixed to both ends of the insulator 1 with cement 9 and electrically connected to the end surfaces 7 of the stack of voltage non-linear resistors 2 through, for example, springs 10.

The contact angles $\theta_1$ and $\theta_2$ between the adhesive layer 5 and the inner wall surfaces 4*a* and 4*b* at the end parts of the insulator 1 are adapted to fall within the above indicated range of 10 to 60 degrees by chamfering the end portion of the inner wall of the insulator 1 to form an inclined surface 12*a* with respect to the end surface 11 of the insulator, as shown at the upper end of the embodiment shown in FIG. 1. Alternatively, the angular arrangement may be made in such a way, as shown at the lower end of FIG. 1, that the inner wall surface 4*b* at the end part of the insulator 1 is a vertical straight surface, while the opposite outer circumferential surface of support means 13, for the voltage non-linear resistors 2, is angled or inclined with respect to the inner wall surface 4*b* to form a desired angle θ within the specified range. It is also possible to combine the above two arrangements to establish the angular relationship. When a support like the support means 13 is not used, the desired contact angle θ may be obtained by inclining the opposite outer circumferential surface of the resistor at the bottom of the stack of resistors 2.

In essence, it is important that at least one of the end faces of the adhesive layer 5 and the associated end part of the inner wall surface be inclined with respect to the longitudinal centerline of the longitudinal bore to form the contact angle θ at opposite ends of the insulator, and that the contact angle θ be held within the range of 10° to 60°, preferably 15° to 40°.

In order for the end surface 7 of the stack of voltage non-linear resistors 2 to be inwardly spaced from the end face or tip 6 of the inorganic adhesive layer 5, as shown in FIG. 1, the stack of the non-linear resistors 2 is supported at its bottom by the support means 13 as described above, and the top end thereof may be provided with an upper support frame 15 having the same outside diameter as that of the resistor 2. As shown at the upper end of the preferred embodiment of FIG. 1, an inner corner portion 14 of the adhesive layer 5 projecting axially outwardly from the end surface 7 of the resistor 2 is chamfered, preferably formed as a partial-spherical surface in order to prevent concentration of thermal stress on said corner part.

The angular range of 10–60 degrees of the contact angle θ of the adhesive layer 5 to the inner wall surface 4*a* (4*b*) at the end part of the insulator 1, has been determined in view of the fact that, as hereinafter described in association with the following preferred embodiments, undesirable cracks are produced due to a thermal stress if the contact angle θ is less than 10° or greater than 60°. Further, the spaced-apart arrangement of the end surface 7 of the voltage non-linear resistor 2 and the end face or tip 6 of the inorganic adhesive layer 5 is preferred to minimize chances of cracks caused by a thermal stress.

The present invention will be described in more detail in connection with the preferred embodiments to manifest constructional and operational features of the lightning arrester insulator of the invention.

EXAMPLE 1

Figure 2:
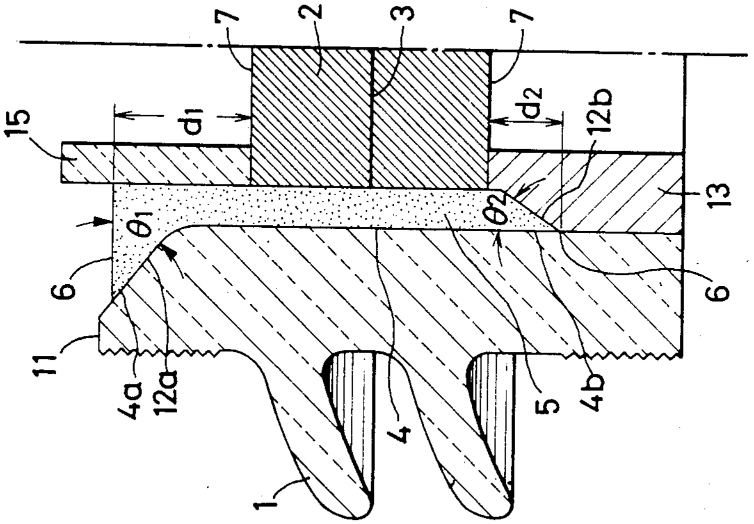
FIG. 2 is an illustrative view, partly in cross section, of a lightning arrester insulator tested in accordance with Example 1.

Porcelain insulators 1 having an inner diameter of 72 mm, a barrel diameter of 122 mm, a shed diameter of 192 mm and a length of 120 mm were cut at their upper end portions to provide an inclinded annular surface 12*a*, as shown in FIG. 2, an angle $\theta_1$ thereof being 10°, 15°, 20°, 30°, 40°, 50° and 60°, respectively with respect to the end face 11, i.e., to the end face 6 of the adhesive layer 6.

Further, an electrically conductive silver paste 3 (made by Engelhard Mineral & chemicals Corporation; Model A-2735) was applied to both surfaces of each voltage non-linear resistor 2 having a major constituent of ZnO with diameter-height sizes of 56 mm×24 mm. Two resistors 2 were joined together with the paste 3, dried, and left in the air for one hour at a maximum temperature of 550° C. Thus, the two voltage non-linear resistors 2 were firmly bonded to each other into an integral assembly in advance.

Support means 13 was used for supporting the voltage non-linear resistors 2 and blocking a downward flow of the adhesive agent 5 composed of glass of low melting point. The support means 13 was made of the same porcelain material as that of the insulator 1. A plurality of the support means 13 were cut at the outer circumferential surface to provide an inclined surface 12*b* so that a contact angle $\theta_2$ of the end face of the adhesive layer 5 to the inner surface 4*b* was 10°, 15°, 20°, 30°, 40°, 50° and 60°, respectively.

Further, in order to prevent flowing of the adhesive glass at the upper end of the insulator, an upper supporting frame 15 having an outer diameter of 56 mm, an inner diameter of 40 mm and a height of 40 mm was prepared in plurality. Each frame 15 was made of the same porcelain material as that of the insulator 1. The voltage non-linear resistor assembly 2 mounted on the supporting means 13 was placed in the central bore of the insulator 1, and the upper supporting frame 15 was mounted on the top of the resistor assembly 2. The adhesive agent 5, i.e., a glass having a low melting point of 470° C. was heated in the air to 490° C. and poured into a space defined by the support means 13, the non-linear resistor assembly 2, the upper support frame 15 and the inner wall surface 4 of the insulator 1, and then cooled to obtain an assembled unit of the lightning arrester insulator of the present invention. Thus, Samples Nos. 1 through 19 were prepared. In these Samples, a spacing depth $d_1$ from the uppoer end face 6 of the solidified inorganic adhesive layer 5 to the upper end surface 7 of the voltage non-linear resistor 2 was 30 mm and a depth $d_2$ between the lower end surface 7 and the lower tip 6 was 15 mm.

For comparison, the products having contact angles $\theta_1$ and $\theta_2$ of 5°, 70°, 80° and 90°, outside the specified range of the present invention, were also prepared as comparative Samples Nos. 20 through 31.

The obtained Samples of the lightning arrester insulators were tested for cracks. The cracks were examined with a dyeing method.

Then, the insulators were immersed alternately in hot water at 60° C. and in methyl alcohol cooled to −40° C.

with dry ice, each for four hours. This alternate heating and cooling cycle was repeated ten times and then the produced cracks were examined and measured with the dyeing method. Test result are indicated in Table 1 which reveals that no cracks were found if both contact angles $\theta_1$ and $\theta_2$ of the adhesive layer to the inner wall surface of the insulator were held within the range of 10° to 60°.

TABLE 1

| | Sample No. | Contact angle $\theta_1$ (°) | Contact angle $\theta_2$ (°) | Observation of outer appearance by a dyeing method: After firing | Observation of outer appearance by a dyeing method: After 10 cycles of cooling and heating tests |
|---|---|---|---|---|---|
| Products of the present invention | 1 | 40 | 60 | All right | All right |
| | 2 | 40 | 50 | All right | All right |
| | 3 | 40 | 40 | All right | All right |
| | 4 | 40 | 30 | All right | All right |
| | 5 | 40 | 20 | All right | All right |
| | 6 | 40 | 15 | All right | All right |
| | 7 | 40 | 10 | All right | All right |
| | 8 | 60 | 30 | All right | All right |
| | 9 | 50 | 30 | All right | All right |
| | 10 | 30 | 30 | All right | All right |
| | 11 | 20 | 30 | All right | All right |
| | 12 | 15 | 30 | All right | All right |
| | 13 | 10 | 30 | All right | All right |
| | 14 | 60 | 60 | All right | All right |
| | 15 | 30 | 60 | All right | All right |
| | 16 | 10 | 60 | All right | All right |
| | 17 | 60 | 10 | All right | All right |
| | 18 | 30 | 10 | All right | All right |
| | 19 | 10 | 10 | All right | All right |
| Comparative products | 20 | 40 | 90 | Cracks were produced at the lower portion | — |
| | 21 | 40 | 80 | All right | Cracks were produced after one cycle |
| | 22 | 40 | 70 | All right | Cracks were produced after three cycles |
| | 23 | 40 | 5 | Cracks were produced at the lower portion | — |
| | 24 | 90 | 30 | Cracks were produced at the upper portion | — |
| | 25 | 80 | 30 | Cracks were produced at the upper portion | — |
| | 26 | 70 | 30 | All right | Cracks were produced after four cycles |
| | 27 | 5 | 30 | All right | Cracks were produced after one cycle |
| | 28 | 90 | 60 | Cracks were produced at the upper portion | — |
| | 29 | 5 | 60 | Cracks were produced at the upper portion | — |
| | 30 | 90 | 10 | Cracks were produced at the upper portion | — |
| | 31 | 5 | 10 | Cracks were produced at the upper portion | — |

— . . . No tests were performed

EXAMPLE 2

An insulator, voltage non-linear resistor having a major constituent of ZnO, a support means, an upper support frame and an adhesive agent of low melting glass, similar to those used in Example 1, were employed while sizes of the support means and upper support frame were varied to change the spacing depths $d_1$, $d_2$ between the end surface of the resistor and the end face or tip of the adhesive layer. The upper spacing depth $d_1$ and lower spacing depth $d_2$ were set to the sizes shown in Table 2. Fittings were cemented to both ends of the insulator to provide lightning arrester insulators according to the present invention, which are designated as Samples Nos. 32 through 59. These lightning arrester insulators were cooled and heated alternately ten times of cycling in the same manner as in Example 1. The insulators were checked for cracks, but no cracks were found in any of the insulators.

Then, they were subjected to electric discharge duration test pursuant to JEC-203-1978. The test results are indicated in Table 2. When both the upper depth $d_1$ and the lower depth $d_2$ were not less than 10 mm, no cracks were found at 60 KA level of the electric discharge.

TABLE 2

| Sample No. | Contact angle $\theta_1$ (°) | Contact angle $\theta_2$ (°) | Spacing depth $d_1$ (mm) | Spacing depth $d_2$ (mm) | Electric discharge duration test 10 kA | 20 kA | 40 kA | 60 kA | 80 kA |
|---|---|---|---|---|---|---|---|---|---|
| 32 | 30 | 60 | 0 | 15 | o | x | — | — | — |
| 33 | 30 | 60 | 2 | 15 | o | o | x | — | — |
| 34 | 30 | 60 | 5 | 15 | o | o | o | x | — |
| 35 | 30 | 60 | 10 | 15 | o | o | o | o | x |
| 36 | 30 | 60 | 20 | 15 | o | o | o | o | o |
| 37 | 30 | 60 | 30 | 15 | o | o | o | o | o |
| 38 | 30 | 60 | 20 | 0 | o | o | x | — | — |
| 39 | 30 | 60 | 20 | 5 | o | o | o | x | — |
| 40 | 30 | 60 | 20 | 10 | o | o | o | o | x |
| 41 | 30 | 60 | 20 | 15 | o | o | o | o | o |
| 42 | 30 | 60 | 20 | 20 | o | o | o | o | o |
| 43 | 30 | 60 | 20 | 30 | o | o | o | o | o |
| 44 | 60 | 30 | 0 | 15 | o | x | — | — | — |
| 45 | 60 | 30 | 2 | 15 | o | x | — | — | — |
| 46 | 60 | 30 | 5 | 15 | o | o | x | — | — |
| 47 | 60 | 30 | 10 | 15 | o | o | o | o | x |
| 48 | 60 | 30 | 20 | 15 | o | o | o | o | x |
| 49 | 60 | 30 | 30 | 15 | o | o | o | o | x |
| 50 | 20 | 30 | 0 | 15 | o | o | x | x | — |
| 51 | 20 | 30 | 5 | 15 | o | o | o | x | — |
| 52 | 20 | 30 | 10 | 15 | o | o | o | o | o |
| 53 | 20 | 30 | 20 | 15 | o | o | o | o | o |
| 54 | 20 | 30 | 30 | 15 | o | o | o | o | o |
| 55 | 10 | 30 | 0 | 15 | o | o | x | x | — |
| 56 | 10 | 30 | 5 | 15 | o | o | o | x | — |

TABLE 2-continued

| Sample No. | Contact angle $\theta_1$ (°) | Contact angle $\theta_2$ (°) | Spacing depth $d_1$ (mm) | Spacing depth $d_2$ (mm) | Electric discharge duration test 10 kA | 20 kA | 40 kA | 60 kA | 80 kA |
|---|---|---|---|---|---|---|---|---|---|
| 57 | 10 | 30 | 10 | 15 | o | o | o | o | o |
| 58 | 10 | 30 | 20 | 15 | o | o | o | o | o |
| 59 | 10 | 30 | 30 | 15 | o | o | o | o | o |

(Note)
o . . . No cracks were produced.
x . . . Cracks were produced.
— . . . No test were performed.

EXAMPLE 3

Figure 3:
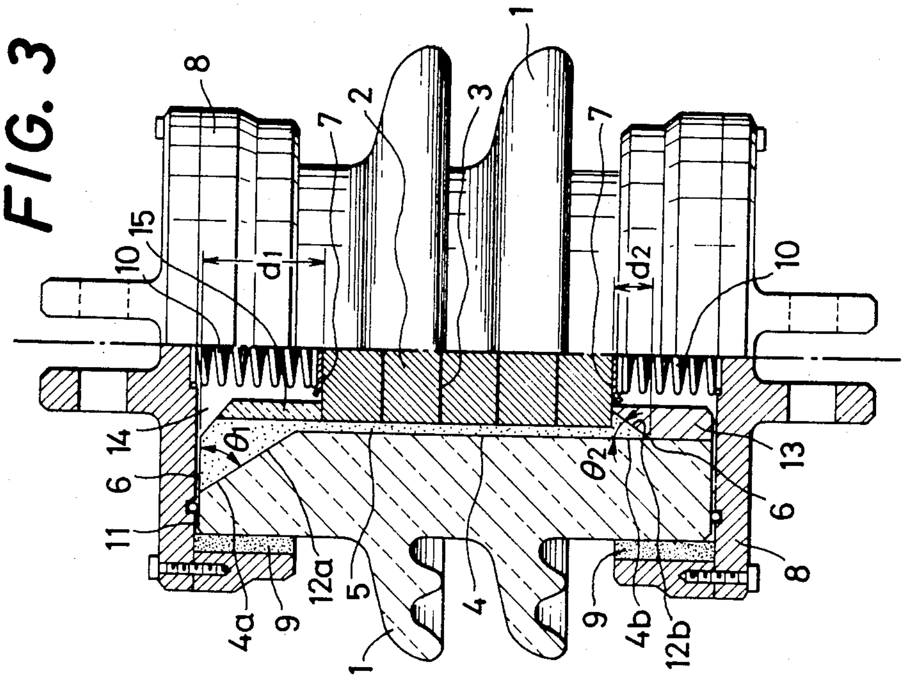
FIG. 3 is an illustrative view, partly in cross section of a lightning arrester insulator tested in accordance with Example 3.

One end of the porcelain insulators each having an inner diameter of 64 mm, a barrel diameter of 144 mm, a shed diameter of 244 mm and a length of 210 mm, was cut to form an inclined surface 4*a*, as shown in FIG. 3, which is slanted at a contact angle $\theta_1$ of 10°, 15°, 20°, 30°, 40°, 50° and 60°, respectively, with regard to the upper end face 11 of the insulator. The outer circumferential surface of the support means 13 for the resistors 2 was cut to form an inclined surface 12*b* such that the angle $\theta_2$ of contact with the lower end face of the adhesive layer 5 was 30°. The spacing depth $d_2$ from the lower tip 6 of the resistor 2 was set to be 15 mm and the entire height of the support means was selected to be 50 mm. The thus machined insulators 1 and support means 13, and a stack of voltage non-linear resistors 2 were assembled to produce insulators according to the invention.

The voltage non-linear resistor assembly 2 was constructed such that the individual non-linear resistors 2, each having a major constituent of ZnO with 56 mm diameter and 24 mm height, were bonded in a stack with silver conductive paste 3 (made by Engelhard Minerals & Chemicals Corporation; Model A-2735) applied to adjacent surfaces of the resistors 2. Thereafter, they were left in the air for one hour at a maximum temperature of 550° C. Thus, a plurality of voltage non-linear resistors 2 were integrated into a firmly bonded assembly. A DC voltage "$V_{1mA}$DC" required for a flow of DC current of 1 mA which is generally used as an index of an electric characteristic of the voltage non-linear resistor 2 and which corresponds to a rise voltage in V-I characteristic of the resistor 2 (hereinafter simply called "$V_{1mA}$DC"), was found to be in a range of 20.4 kV to 21.3 kV.

An upper support frame 15 having the same outer diamter as that of the resistor 2 was placed on top of the stacked non-linear resistors 2. The adhesive agent 5 comprising glass of a low melting point of 510° C. was poured, in the air, under a reduced pressure, at 510° C., into a space between the stacked resistors 2, the frame 15, and the inner wall surface 4 of the insulator 1, up to substantially the same level as the upper end face 11 of the insulator. In this case, the depth $d_1$ at the upper end was about 50 mm, and the measurement of $V_{1mA}$DC for each of the lightning arrester insulators Samples Nos. 1 through 7 was held within the above indicated range of 20.4 kV to 21.1 kV. Thus, no variationn of $V_{1mA}$DC was found.

Fixing fittings 8 were fixed to both ends of the insulator 1 with cement 9, and each of seven kinds of lightening arrester insulators of the present invention in which the voltage non-linear resistors 2 having a major constituent of ZnO were integrally fixed in the insulator 1 with adhesive agent 5 of inorganic glass. Thus, Samples Nos. 1 through 7 were prepared.

For the sake of comparison, the products having angular dimensions outside of the specified range of the invention were prepared as comparative products designated as Samples Nos. 8 through 10. Also prepared was Sample No. 11 having contact angles $\theta_1$ and $\theta_2$ of 90°. Samples 8, 10 and 11 of these products demonstrated some cracks during their firing and a decrease in value of $V_{1mA}$DC.

The lightning arrester insulators with no cracks generated during firing operations were immersed alternately in hot water of 60° C. and methyl alcohol cooled to −40° C. with dry ice, each for four hours. This heating and cooling cycle was repeated ten times. The products were observed for cracks with a dyeing method, and a value of $V_{1mA}$DC thereof was measured.

No cracks were found in any of the lightning arrester insulators of the present invention, and no variation in a value of $V_{1mA}$DC was discovered. These tests revealed that the products of the invention maintained initial electric characteristics of the voltage non-linear resistor. On the other hand, the comparative product, Sample No. 9 with the specification outside the range of the invention exhibited some cracks extending up to a surface of the insulator upon completion of two cycles of the heating and cooling test and a substantial decrease in $V_{1mA}$DC value.

Then, the lightning arrester insulators of the present invention with no cracks after the above-described tests were further subjected to an electric discharge duration test according to JEC-203-1978 and the produced cracks were observed. These results are indicated in Table 3.

TABLE 3

| | Sample No. | Contact angle $\theta_1$ (°) | Contact angle $\theta_2$ (°) | $V_{1mA}$ DC (kV) Before firing | $V_{1mA}$ DC (kV) After firing | $V_{1mA}$ DC (kV) After a cooling/heating test | Condition of the produced cracks: After firing | Condition of the produced cracks: After a cooling and heating test | Electric discharge duration test 10 kA | 20 kA | 40 kA | 60 kA | 80 kA |
|---|---|---|---|---|---|---|---|---|---|---|---|---|---|
| Products of the present invention | 1 | 10 | 30 | 20.5 | 20.7 | 20.7 | All right | All right | o | o | o | o | x |
| | 2 | 15 | 30 | 21.3 | 21.1 | 21.0 | All right | All right | o | o | o | o | o |
| | 3 | 20 | 30 | 21.0 | 20.6 | 21.2 | All right | All right | o | o | o | o | o |
| | 4 | 30 | 30 | 20.8 | 20.7 | 20.5 | All right | All right | o | o | o | o | o |
| | 5 | 40 | 30 | 20.4 | 20.4 | 20.8 | All right | All right | o | o | o | o | o |
| | 6 | 50 | 30 | 20.8 | 20.7 | 20.9 | All right | All right | o | o | o | o | x |
| | 7 | 60 | 30 | 20.5 | 20.7 | 20.6 | All right | All right | o | o | o | x | — |
| Comparative products | 8 | 5 | 30 | 20.7 | 19.8 | — | Cracks were produced at upper part | — | — | — | — | — | — |
| | 9 | 70 | 30 | 21.1 | 21.3 | 14.3 | All right | Cracks were produced after a completion of | — | — | — | — | — |

TABLE 3-continued

| | Sample No. | Contact angle $\theta_1$ (°) | Contact angle $\theta_2$ (°) | $V_{1mA}$ DC (kV) Before firing | $V_{1mA}$ DC (kV) After firing | $V_{1mA}$ DC (kV) After a cooling/heating test | Condition of the produced cracks: After firing | Condition of the produced cracks: After a cooling and heating test | Electric discharge duration test 10 kA | 20 kA | 40 kA | 60 kA | 80 kA |
|---|---|---|---|---|---|---|---|---|---|---|---|---|---|
| | | | | | | | | two cycles | | | | | |
| | 10 | 80 | 30 | 20.7 | 18.8 | — | Cracks were produced at upper part | — | — | — | — | — | — |
| Prior products | 11 | 90 | 90 | 20.8 | 19.2 | — | Cracks were produced at lower part | — | — | — | — | — | — |

Spacing depth $d_1$ = 50 mm
$d_2$ = 15 mm
—: No test was made.
o: No cracks were found.
x: Cracks were produced.

The products of the present invention demonstrated no cracks during their firing, heating and coling tests as well as their electric discharge duration test, and it was noted in particular that the lightning arrester insulators (Samples Nos. 2 through 5) having a contact angle between the porcelain and the adhesive layer of 15° to 40° showed excellent heat resistance characteristics.

As described above, the lightning arrester insulator of the present invention may be used as a stable lightning arrester insulator for a long period of time permitting protection of various kinds of power plant facilities and substations against an excessive flow of current or surge caused by lightning. This is accomplished with a simple structure wherein a contact angle $\theta$ of the inorganic adhesive layer with respect to the inner wall surface at opposite ends of the insulator is kept within a range of 10° to 60°. Such arrangement protects the insulator against damage due to a thermal stress during manufacture, or upon the occurrence of a lightning or another similar surge. As a result, the lightning arrester insulator of the present invention is extremely useful and effective in its industrial application.

While the present invention has been described in its preferred embodiments, it is to be understood that the invention is not limited thereto but may be otherwise embodied within the scope of the following claims.

What is claimed is:

1. A lightning arrester insulator comprising:
an insulator portion having an inner wall surface defining a longitudinal bore through the insulator;
a voltage non-linear resistor consisting essentially of ZnO, said resistor being located within said longitudinal bore of the insulator;
an adhesive layer located between an outer surface of said resistor and said inner wall surface of said insulator, said adhesive layer consisting essentially of an inorganic material, said adhesive layer forming a contact angle within a range of 10° to 60° between each end surface of the adhesive layer and said inner wall surface of the insulator.

2. The lightning arrester insulator of claim 1, wherein said contact angle is within a range of 15° to 40°.

3. The lightning arrester insulator of claim 1, wherein said inner wall surface is inclined with respect to a centerline of said longitudinal bore at a position adjacent to at least one of said each end surface of the adhesive layer, thereby forming said contact angle.

4. The lightning arrester insulator of claim 1, wherein each end surface of the voltage non-linear resistor is spaced axially inwardly along a longitudinal centerline of said longitudinal bore from each corresponding end surface of the adhesive layer.

5. The lightning arrester insulator of claim 4, wherein each end surface of the voltage non-linear resistor is spaced 10 mm from each corresponding end surface of the adhesive layer.

6. The lightning arrester of claim 1, wherein said voltage non-linear resistor is mounted on a support means located within said longitudinal bore at one end of the insulator, said support means comprising an outer circumferential surface which is inclined with respect to a centerline of said longitudinal bore at a position adjacent to one of said each end surface of the adhesive layer, thereby forming said contact angle.

7. The lightning arrester of claim 5, wherein said voltage non-linear resistor is in abutting contact with support means located within said longitudinal bore, such that each end surface of the resistor is located axially inwardly from end surfaces of the longitudinal bore.

8. A lightning arrester insulator comprising:
an insulator portion including longitudinal ends and an inner wall surface defining a longitudinal bore through the insulator;
a voltage non-linear resistor including longitudinal ends, said resistor consisting essentially of ZnO and being located within said longitudinal bore of the insulator, such that each of said longitudinal ends of the resistor are located axially inwardly from the longitudinal ends of the insulator;
an adhesive layer located between an outer surface of said resistor and said longitudinal bore of said insulator, said adhesive layer consisting essentially of an inorganic material and including longitudinal ends, wherein said longitudinal ends of the adhesive layer are located axially outwardly from said longitudinal ends of the resistor, said adhesive layer forming a contact angle within a range of 10° to 60° between each longitudinal end of the adhesive layer and said inner wall surface of the insulator.

9. The lightning arrester insulator of claim 8, wherein said contact angle is within a range of 15° to 40°.

10. The lightning arrester insulator of claim 8, wherein said inner wall surface is inclined with respect a centerline of said longitudinal bore at a positive adjacent to at least one of said longitudinal ends of the adhesive layer, thereby forming said contact angle.

11. The lightning arrester insulator of claim 8, wherein said longitudinal ends of the adhesive layer are located 10 mm axially outwardly from said longitudinal ends of the voltage non-linear resistor.

12. The lightning arrester of claim 8, wherein said voltage non-linear resistor is mounted on a support means located within said longitudinal bore at one of said longitudinal ends of the insulator, said support means comprising an outer circumferential surface which is inclined with respect to a centerline of said longitudinal bore at a position adjacent to one of said longitudinal end surfaces of the adhesive layer, thereby forming said contact angle.

13. The lightning arrester of claim 12, wherein said voltage non-linear resistor is in abutting contact with support means located within said longitudinal bore, such that each of said longitudinal end surfaces of the resistor is located axially inwardly from said longitudinal ends of the insulator.

* * * * *